US011155032B2

(12) United States Patent
Kwak (10) Patent No.: US 11,155,032 B2
(45) Date of Patent: Oct. 26, 2021

(54) CURING DEVICE

(71) Applicants: Ju Hyun Kwak, Seoul (KR); DAPEX GLOBAL CO., LTD., Seoul (KR); Jaemyung Industrial Co., Ltd., Gimpo-si (KR)

(72) Inventor: Ju Hyun Kwak, Seoul (KR)

(73) Assignees: Ju Hyun Kwak, Seoul (KR); Dapex Global Co., Ltd., Seoul (KR); Jaemyung Industrial Co., Ltd., Gimpo-si (KR)

( * ) Notice: Subject to any disclaimer, the term of this patent is extended or adjusted under 35 U.S.C. 154(b) by 79 days.

(21) Appl. No.: 16/532,307

(22) Filed: Aug. 5, 2019

(65) Prior Publication Data

US 2020/0055242 A1 Feb. 20, 2020

(30) Foreign Application Priority Data

Aug. 6, 2018 (KR) ......................... 10-2018-0091416

(51) Int. Cl.
*B29C 35/08* (2006.01)
*B29C 64/264* (2017.01)
*B33Y 30/00* (2015.01)

(52) U.S. Cl.
CPC ........ *B29C 64/264* (2017.08); *B29C 35/0805* (2013.01); *B33Y 30/00* (2014.12); *B29C 2035/0827* (2013.01)

(58) Field of Classification Search
CPC ... B29C 64/264; B29C 64/245; B29C 64/241; B29C 64/25; B29C 35/0805; B29C 2035/0827; B33Y 30/00
See application file for complete search history.

(56) References Cited

U.S. PATENT DOCUMENTS

| 5,477,054 A * | 12/1995 | Tateosian | A61C 19/003 250/492.1 |
| 7,089,686 B2 * | 8/2006 | Lange | B05D 3/067 34/278 |
| 7,186,108 B2 * | 3/2007 | Zychek | A61C 19/003 264/494 |
| 7,323,663 B2 * | 1/2008 | Cavada | F24C 7/04 219/405 |

(Continued)

FOREIGN PATENT DOCUMENTS

| CN | 106827513 A | 6/2017 |
| JP | 05-338042 | 12/1993 |

OTHER PUBLICATIONS

UV Cure Box, https://3dprint.com/113283/formlabs-uv-cure-box/, published Dec. 30, 2015 (Year: 2015).*

(Continued)

*Primary Examiner* — Wyatt A Stoffa
(74) *Attorney, Agent, or Firm* — Heedong Chae; Lucem, PC (57) ABSTRACT

Disclosed is a curing device for a 3D printer. The curing device for a 3D printer according to the present invention includes: a main body having a reflection plate therein and having a sealing structure; a plurality of light energy irradiating units provided inside the main body and irradiating a curing target with light energy to cure the curing target; and a support unit provided inside the main body and rotatably supporting the curing target.

6 Claims, 6 Drawing Sheets

(56) References Cited

U.S. PATENT DOCUMENTS

| | | | | |
|---|---|---|---|---|
| 8,696,155 | B2* | 4/2014 | Okamitsu | A61L 2/10 362/227 |
| 8,835,886 | B2* | 9/2014 | Vu | A45D 29/001 250/494.1 |
| 9,964,358 | B2* | 5/2018 | Matsushita | F26B 5/08 |
| 10,118,193 | B1* | 11/2018 | Lin | G02B 6/102 |
| 2006/0032573 | A1 | 2/2006 | Gilkerson et al. | |
| 2007/0241471 | A9* | 10/2007 | Wires | B29C 35/0888 351/159.62 |
| 2007/0286963 | A1* | 12/2007 | Rocha-Alvarez | B05D 3/067 427/508 |
| 2009/0283119 | A1* | 11/2009 | Moussa | B29C 71/04 134/57 R |
| 2010/0252753 | A1* | 10/2010 | Wang | A61C 13/14 250/492.1 |
| 2011/0248183 | A1* | 10/2011 | Yang | G21K 1/062 250/453.11 |
| 2012/0319012 | A1* | 12/2012 | Fleischhacker | B05D 3/067 250/492.1 |
| 2013/0040043 | A1* | 2/2013 | Larson | B01F 9/04 427/2.24 |
| 2014/0346372 | A1* | 11/2014 | Vu | A45D 29/001 250/492.1 |
| 2016/0107380 | A1* | 4/2016 | Smoot | B29C 64/124 264/401 |
| 2016/0200119 | A1* | 7/2016 | Rae | B41J 11/002 250/372 |
| 2018/0036941 | A1* | 2/2018 | Xu | B29C 64/393 |

OTHER PUBLICATIONS

UV Curing, https://hackaday.io/project/16701-adam-dlp-3d-printer/log/55919-vacuum-uv-curing, published Mar. 29, 2017 (Year: 2017).*

Form Cure, as described in the Form Care guide of Jan. 2018 (Year: 2018).*

DIY UV Post-curing Lightbox Ensures SLA Prints are Complete, https://3dprint.com/27720/post-curing-lightbox-sla/, published Dec. 8, 2014 (Year: 2014).*

* cited by examiner

CURING DEVICE

CROSS-REFERENCE TO RELATED APPLICATIONS

This application claims the priority of Korean Patent Application No. 10-2018-0091416 filed on Aug. 6, 2018, in the Korean Intellectual Property Office, the disclosure of which is incorporated herein by reference.

BACKGROUND OF THE INVENTION

Field of the Invention

The present invention relates to a curing device, and more particularly, to a curing device for curing a curing target using light energy and heat energy.

Description of the Related Art

A method for manufacturing a three-dimensional stereoscopic product includes a mock-up method for manufacturing a product by hand while viewing a drawing and a cutting method using a numerically controlled machine tool.

The mock-up method has a disadvantage in that manufacturing cost is low but sophisticated shape processing is difficult and a lot of time is required.

In addition, the cutting method by the machine tool has a drawback in that a precise product can be produced, but the manufacturing cost is high and there is a limitation in shape that can be processed.

In recent years, 3D printers for printing and manufacturing three-dimensional products using 3D drawing data by three-dimensional modeling have been widely used.

The 3D printer manufactures a molded article having a three-dimensional shape by using a material such as a liquid, a powdered polymer, a metal, or the like according to three-dimensional drawing data.

By using the 3D printer, the manufacturing cost and the manufacturing time can be greatly reduced, personalized manufacturing is possible, and complex three-dimensional shapes can be easily manufactured.

Accordingly, the shape can be easily modified during actual product manufacturing, there is an advantage that the manufacturing cost, material cost, and labor costs can be reduced.

The 3D printer having the above advantages is used in various fields such as automotive, aviation, architecture, medical, home appliances, toys, and the like.

The above-described 3D printer includes a Stereo Lithography Apparatus (SLA) scheme for scanning a laser on a photocurable resin to cure the scanned portion, a Digital Light Processing (DLP) scheme for irradiating and curing light to a lower part of a storage tank in which the photocurable resin is stored, an LCD scheme for laminating resin molded products on top of a build plate by using a UV light source and an LCD panel, a Selective Laser Sintering (SLS) scheme for sintering using functional polymer or metal powder, a Fused Deposition Modeling (FDM) scheme for extruding a molten resin, a laser-aid direct metal tooling (DMT) scheme for forming metal directly with a high-power laser beam, and a laminated object manufacturing (LOM) scheme, which is a machine-joined molding method.

Among them, in the SLA, DLP, and LCD schemes using a photocurable resin, the molded product may be manufactured, washed, and then subjected to a separate curing process to obtain a desired strength and a desired color.

The apparatus used in the above-mentioned curing process is generally called a "post-curing machine", and the post-curing machine includes a Ultra Violet (UV) post-curing machine and a UV curing machine using a UV Light Emitting Diode (LED).

Since the post-curing machine using the UV lamp has a durability problem, the post curing machine of the UV LED scheme has been used a lot recently.

The post curing machine of the UV LED scheme is excellent in durability but has a disadvantage of forming the inside of a curing chamber under high temperature conditions.

The post curing machine in the related art cures the molded article by an LED light source after putting the molded article in a rectangular curing chamber.

However, the post curing machine in the related art has a problem that since the curing chamber is formed in a square or cylindrical shape, it is difficult to keep uniform an internal temperature of the curing chamber.

In other words, a temperature difference occurs between a center portion and an edge portion of the curing chamber, and it becomes difficult to cure the molded article by heating the molded article evenly.

In order to solve such a problem, there is a method for varying a heating temperature of each LED light source by placing a plurality of LED light sources in various positions inside the curing chamber.

However, when a plurality of LED light sources is arranged at various positions inside the curing chamber and the heating temperature is changed, there is a problem that configurations of a curing mechanism and a circuit become complicated.

The above-described technical configuration is a background technique for assisting the understanding of the present invention, and does not mean a conventional technology widely known in the art to which the present invention belongs.

SUMMARY OF THE INVENTION

Accordingly, the present invention has been made in an effort to provide a curing device which has a simple configuration to irradiate uniform light energy and heat energy.

An exemplary embodiment of the present invention provides a curing device including: a main body having a reflection plate therein and having a sealing structure; a plurality of light energy irradiating units provided inside the main body and irradiating a curing target with light energy to cure the curing target; a support unit provided inside the main body and rotatably supporting the curing target; and a heat energy supply unit provided inside the main body and supplying heat energy to the curing target.

The reflection plate may be provided on an internal bottom wall, a ceiling wall, and side walls of the main body as a whole.

The plurality of light energy irradiating units may include a plurality of lamp supports coupled to a rear wall of the main body, and a plurality of irradiating lamps coupled to the plurality of lamp supports and irradiating the curing target with the light energy.

The plurality of lamp supports may be provided on the rear wall in a circular shape.

The plurality of lamp supports may be disposed spaced apart from each other.

The main body may include a base body accommodating the plurality of light energy irradiating units and the reflection plate therein, and a lower fixation plate supporting a lower portion of the base body.

The support unit may include a support in which one side portion is rotatably disposed on the lower fixation plate through an internal bottom portion of the base body, a rotation plate coupled to the other portion of the support and rotated together with the support and disposed inside the base body and placed with the curing target, and a rotating motor provided on the lower fixation plate and rotating the support.

A plurality of plate holes may be provided on the rotation plate.

The rotation plate may be disposed above the plurality of light energy irradiating units disposed at the internal bottom portion of the base body.

The curing device may further include a temperature sensor disposed inside the main body.

The curing target is manufactured by a 3D printer.

According to embodiments of the present invention, an inside of a main body is formed in a sealed structure and a reflection plate is provided inside the sealed main body and a plurality of light energy irradiating units is provided to cure a curing target placed on a support unit by uniformly irradiating light energy by the reflection plate.

Further, complex energy is irradiated to post curing of the curing target by a heat energy supply unit which may supply additional heat energy according to a light source to cure the curing target.

Furthermore, since the support unit placed in the curing target is rotatably provided, the curing target can be more uniformly and efficiently cured.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

In order to sufficiently appreciate the present invention, operational advantages of the present invention, objects achieved by exemplary embodiments the present invention, accompanying drawings illustrating the exemplary embodiments of the present invention and contents disclosed in the accompanying drawings should be referred.

Hereinafter, by describing a preferred exemplary embodiment of the present invention with reference to the accompanying drawings, the present invention will be described in detail. Like reference numerals illustrated in the respective drawings designate like members.

In the exemplary embodiment, a curing target includes a target manufactured by a 3D printer.

Figure 1:
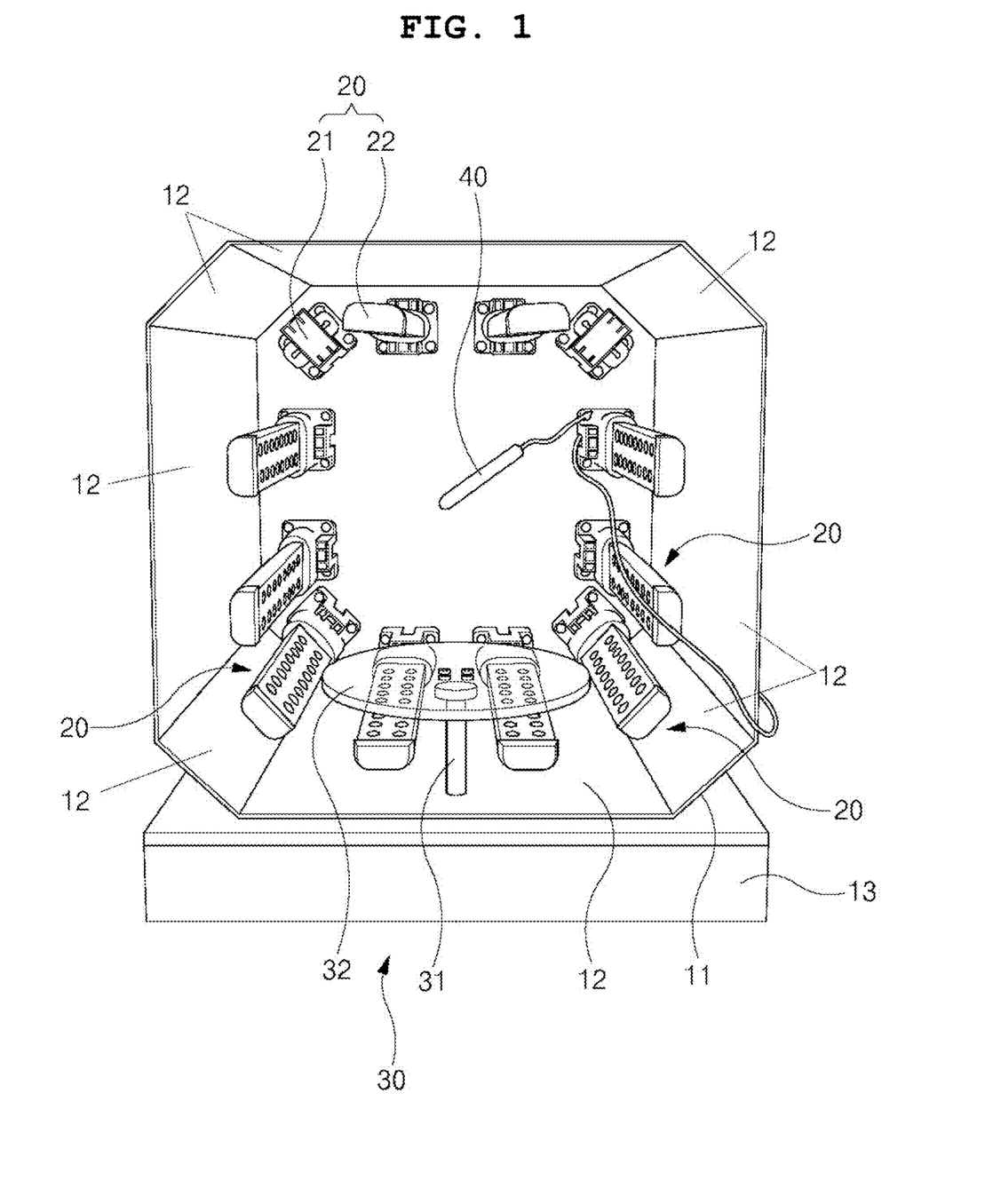
FIG. 1 is a diagram schematically illustrating a curing device according to an exemplary embodiment of the present invention.
Figure 2:
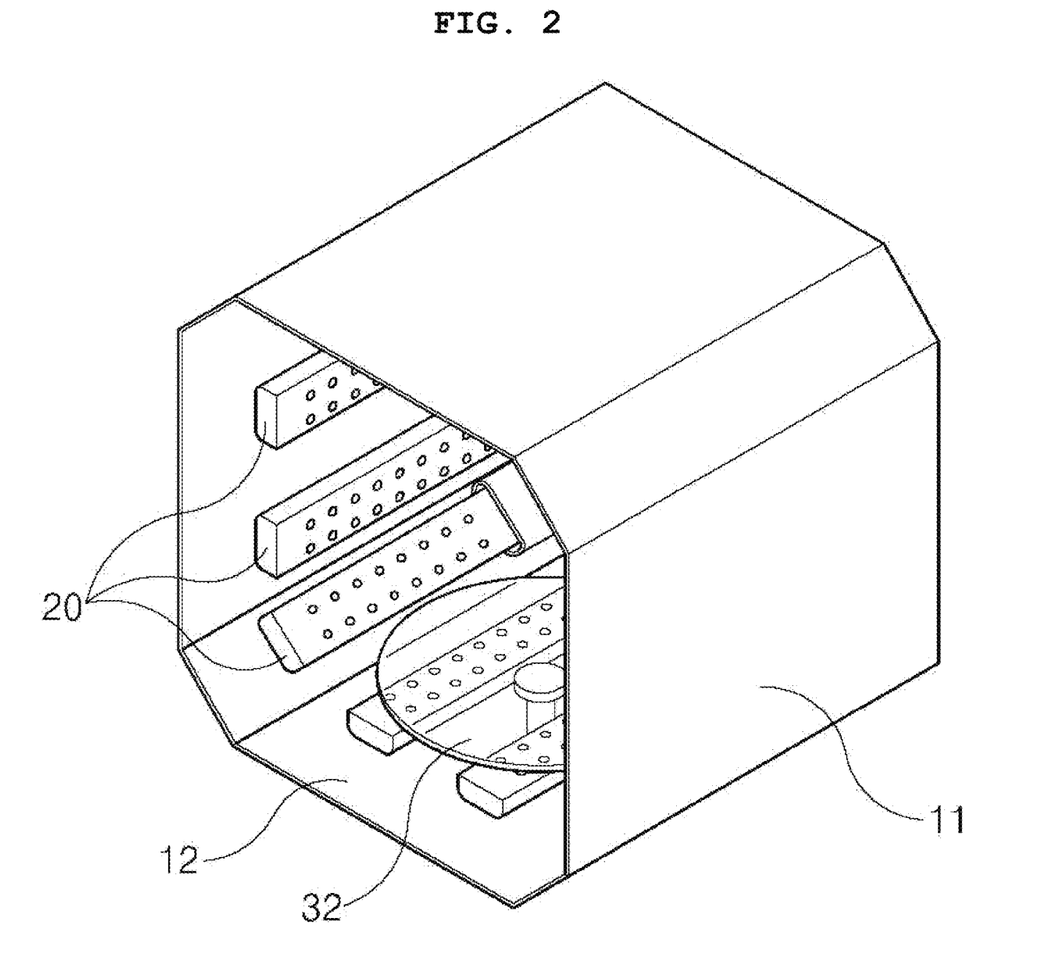
FIG. 2 is a diagram schematically illustrating that a lower fixation plate is deleted in FIG. 1.
Figure 3:
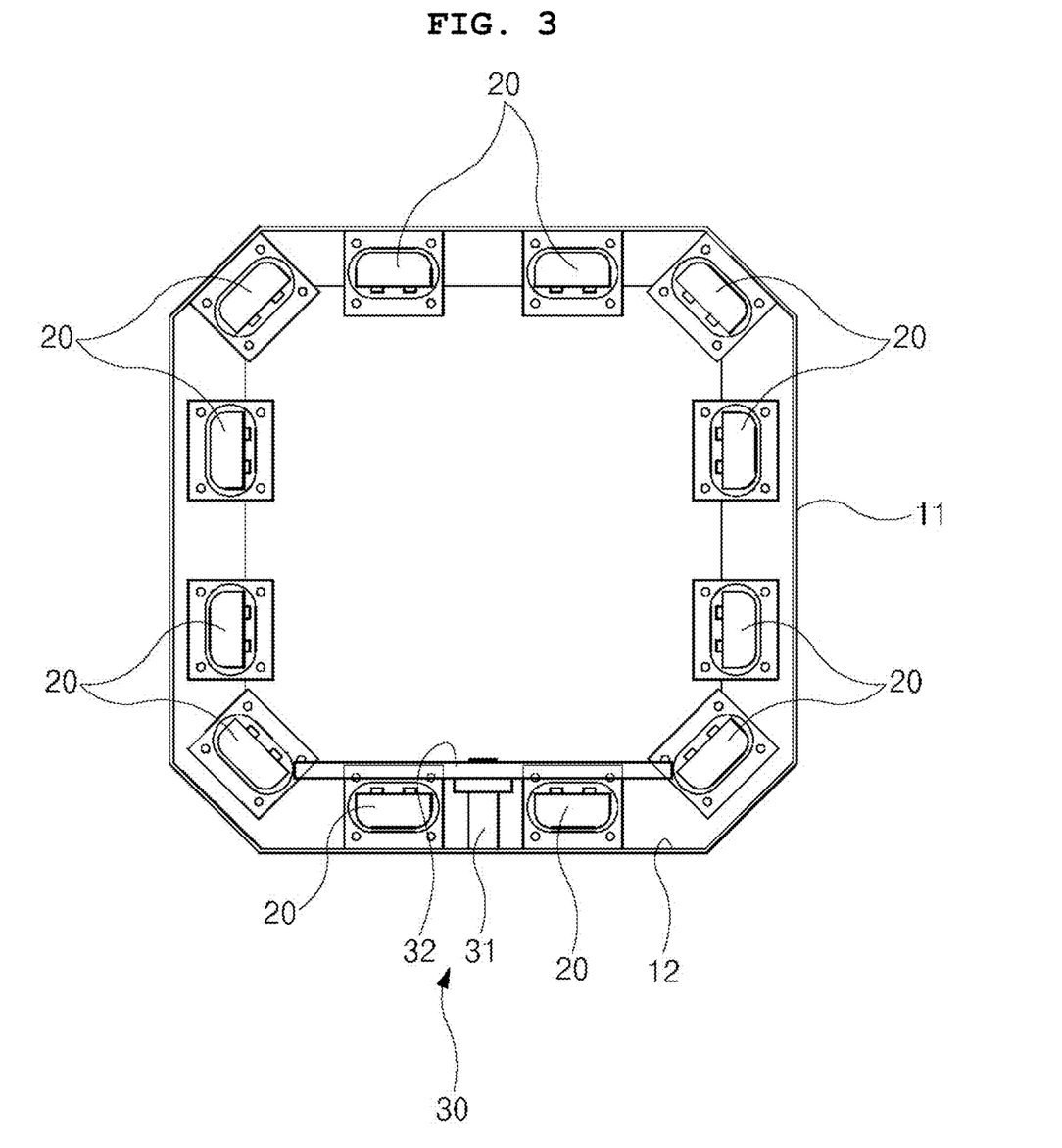
FIG. 3 is a schematic front view of FIG. 2.
Figure 4:
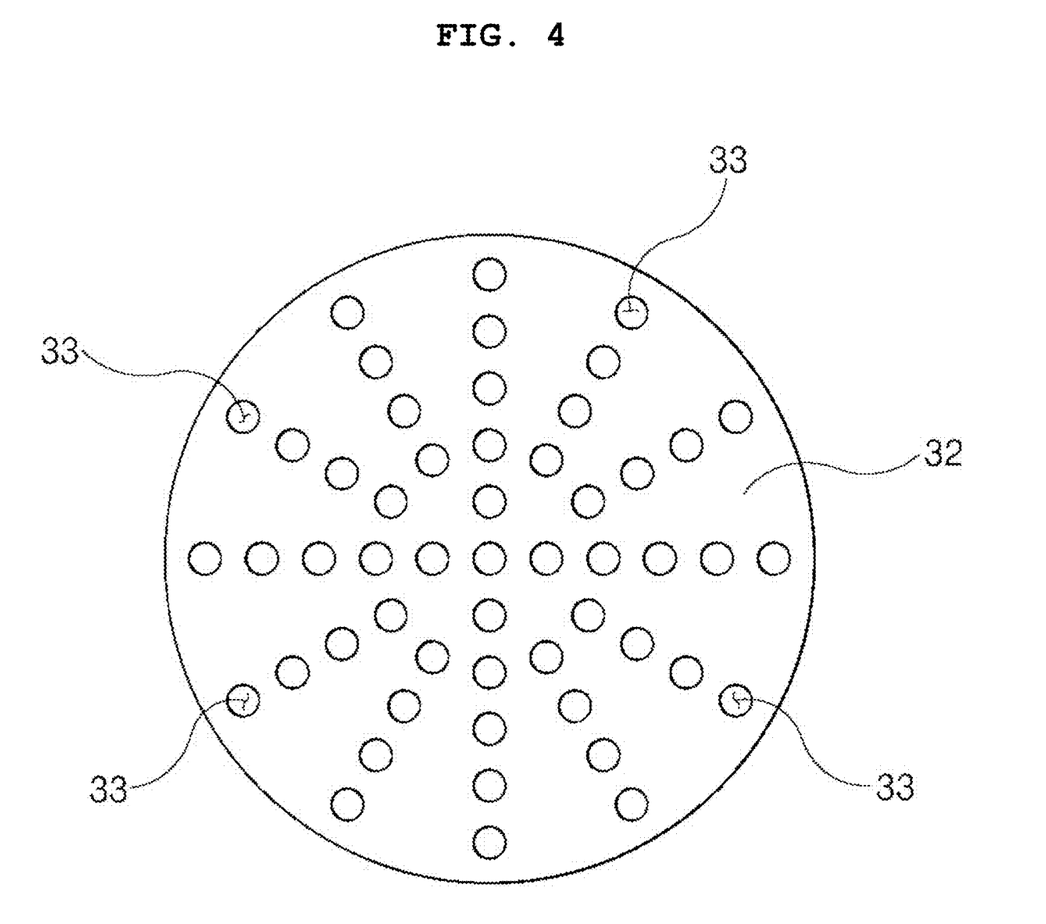
FIG. 4 is a schematic enlarged diagram of a rotation plate illustrated in FIG. 1.
Figure 5:
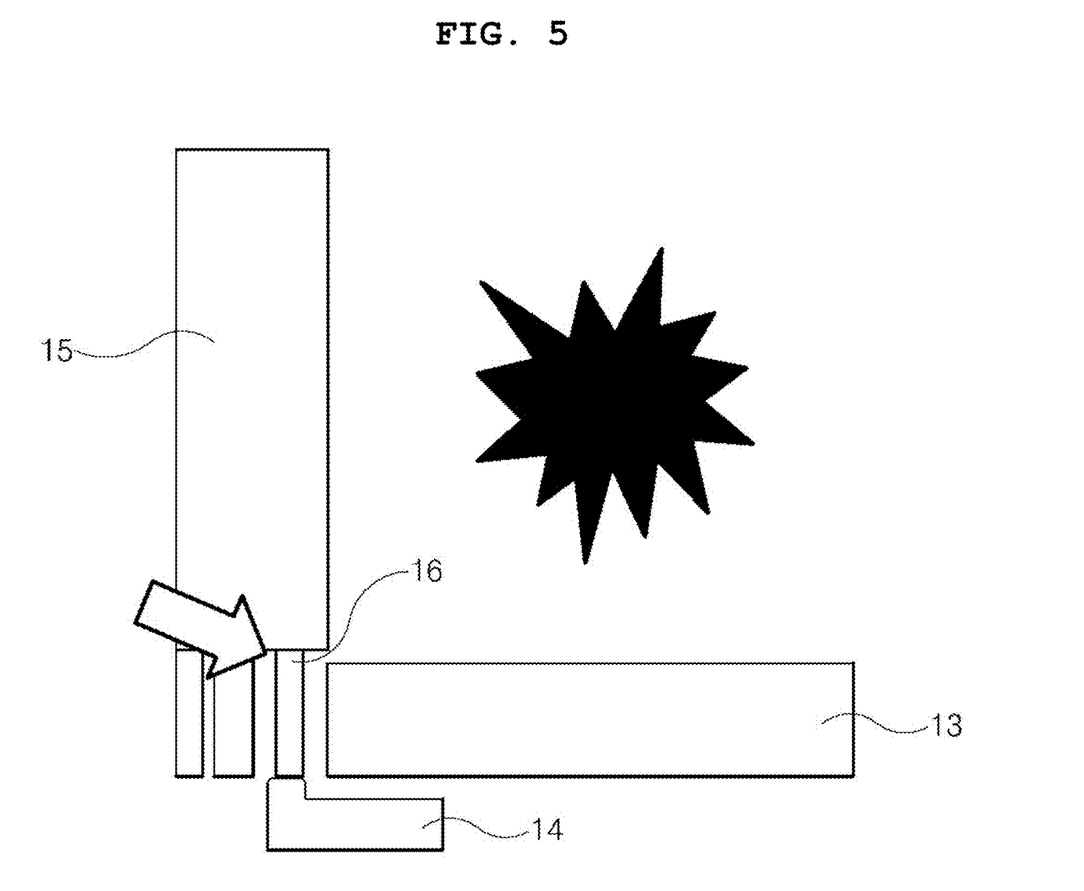
FIG. 5 is a diagram schematically illustrating a means for preventing a phenomenon in which a light source is viewed at the time of opening a cover openably/closably coupled to a base body illustrated in FIG. 1.
Figure 6:
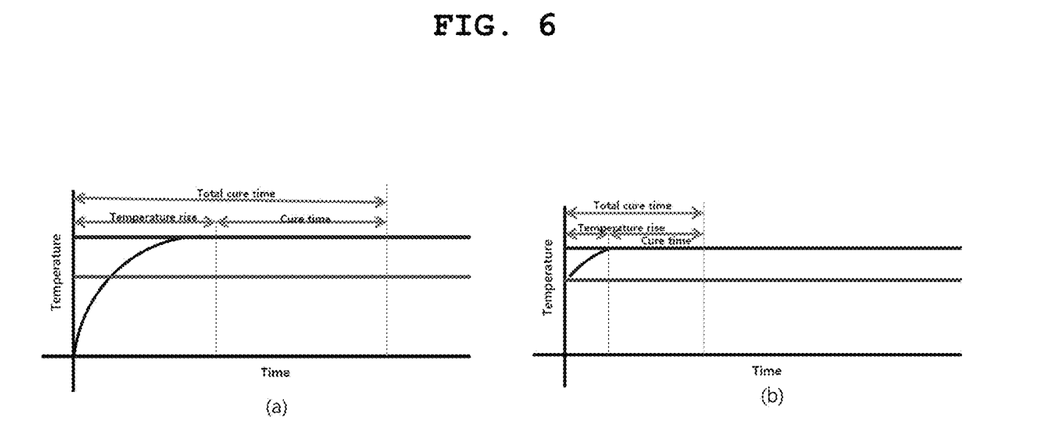
FIG. 6 is a diagram schematically illustrating a warm-up function according to an exemplary embodiment.

FIG. 1 is a diagram schematically illustrating a curing device according to an exemplary embodiment of the present invention, FIG. 2 is a diagram schematically illustrating that a lower fixation plate is deleted in FIG. 1, FIG. 3 is a schematic front view of FIG. 2, FIG. 4 is a schematic enlarged diagram of a rotation plate illustrated in FIG. 1, FIG. 5 is a diagram schematically illustrating a means for preventing a phenomenon in which a light source is viewed at the time of opening a cover openably/closably coupled to a base body illustrated in FIG. 1, and FIG. 6 is a diagram schematically illustrating a warm-up function according to an exemplary embodiment.

As illustrated in the drawings, a curing device 1 according to the exemplary embodiment includes a main body 10 having a sealing structure, a plurality of light energy irradiating units 20 provided inside the main body 10 and irradiating a curing target with light energy and curing the curing target, a support unit 30 provided inside the main body 10 and rotatably supporting the curing target, a temperature sensor 40 provided inside the main body 10, and a heat energy supply unit 50 provided inside the main body 10 and supplying heat energy to the curing target.

As illustrated in FIG. 1, the main body 10 includes a base body 11 having an empty interior, a reflection plate 12 provided in the base body 11 and reflecting the light energy irradiated from the plurality of light energy irradiating units 20, a lower fixation plate 13 provided at a lower portion of the base body 11 and supporting the base body 11, a door sensing rod coupled to the lower fixation plate 13 and sensing opening of a door, a blocking cover 15 provided at a front portion of the base body 11 and blocking an opened front portion of the base body 11 at the time of opening the door to prevent the light energy from being exposed to the outside of the base body 11, and a push rod provided in the door sensing rod 14 and sensing the blocking cover 15.

As illustrated in FIG. 3, the base body 11 of the main body 10 may have an octagonal shape, and a horizontal portion and a vertical portion may be provided three times longer than an inclined portion connecting the horizontal portion and the vertical portion. This is to uniformly irradiate the light energy by arranging the plurality of light energy irradiating units 20 in a circular shape inside the sealed base body 11 by placing only one light energy irradiating unit 20 at the inclined portion and placing two light energy irradiating units 20 at each of the vertical portion and the horizontal portions.

As illustrated in FIG. 1, the reflection plate 12 of the main body 10 is provided on an inner bottom wall, a ceiling wall, and a sidewall of the base body 11 as a whole to reflect all light energy irradiated from the plurality of light energy irradiation units 20.

In addition, in the exemplary embodiment, the reflection plate 12 may have the octagonal shape like the base body 11 described above, and contents regarding the horizontal portion, the vertical portion, and the inclined portion of the base body 11 may also be applied to the reflection plate 12 as it is.

As illustrated in FIG. 1, the lower fixation plate 13 of the main body 10 is coupled to the lower portion of the base body 11 to support the base body 11, and may be provided as an accommodation place of the lower portion of the support unit 31 and a rotating motor.

As illustrated in FIG. 5, the door sensing rod 14 of the main body 10 may be coupled to the lower fixation plate 13 to sense the opening of the door by the push rod 16.

In the exemplary embodiment, the door sensing rod 14 may be detachably bolted to an upper surface portion of the lower fixation plate 13 illustrated in FIG. 2 and the push rod 16 may be provided at the upper portion of the door sensing rod 14.

In the exemplary embodiment, a length of the push rod 16 is large to prevent a phenomenon in which light leaks because the door of the main body 10 is opened at the moment when light is emitted in response to a door sensor.

The blocking cover 15 of the main body 10 may prevent ultraviolet irradiated from the light energy irradiating unit 20 from being exposed to the outside of the base body 11 at the time of opening the door.

In the exemplary embodiment, the blocking cover 15 may be coupled to the front portion of the base body 11 independently of the door and openably/closably hinge-coupled to the base body 11.

The push rod 16 of the main body 10 may be provided at the upper portion of the door sensing rod 14 and an upper end portion of the push rod 16 may contact the lower portion of the blocking cover 15.

As illustrated in FIG. 1, the plurality of light energy irradiating units 20 is provided on a rear wall of the base body 11 to irradiate the curing target placed on the rotation plate 32 with the light energy, thereby curing the curing target.

In the exemplary embodiment, as illustrated in FIG. 1, the plurality of light energy irradiating units 20 may include a plurality of lamp support units 21 coupled to the rear wall of the main body 10 and a plurality of irradiating lamps 22 coupled to the plurality of lamp support units 21 and irradiating the curing target with the light energy.

The plurality of lamp support units 21 of the plurality of light energy irradiating units 20 may be provided on the rear wall of the base body 11 in the circular shape.

Further, in the exemplary embodiment, the plurality of lamp support units may be arranged spaced apart from each other.

The plurality of irradiating lamps 22 may be detachably fitted to the plurality of lamp support units 21 and may irradiate the curing target with the ultraviolet.

In the exemplary embodiment, the plurality of irradiating lamps 22 may use LED lamps having wavelengths of 405 nm and 385 nm.

The support unit 30 is provided inside the main body 10 to rotatably support the curing target.

In the exemplary embodiment, the support unit 30 includes a support 31 having a lower portion rotatably disposed on the lower fixation plate 13 through an inner bottom portion of the base body 11, a rotation plate 32 coupled to the upper portion of the support 31 and rotated together with the support 31 and disposed inside the base body 11 and placed with the curing target, and a rotating motor provided on the lower fixation plate 13 and supporting the support 31.

In the exemplary embodiment, as illustrated in FIG. 1, the rotation plate 32 may be disposed close to the bottom portion of the base body 11 and a pair of light energy irradiating units may be disposed below the rotation plate 32.

Further, in the exemplary embodiment, as illustrated in FIG. 4, a plurality of plate holes 33 is provided on the rotation plate 32, and as a result, the light energy irradiated from a pair of light energy irradiating units 20 disposed below the rotation plate 32 may be irradiated to the curing target through the plurality of plate holes 33.

As such, in the exemplary embodiment, the rotation plate 32 is disposed close to the bottom portion of the base body 11 so that most of the light energy irradiating units 20 are disposed at the upper portion of the rotation plate 32 to irradiate the curing target with most light energy and the light energy irradiated from a pair of light energy irradiating units 20 disposed below the rotation plate 32 may be irradiated to the curing target through the plurality of plate holes 33 and heat flowability is increased in side the base body 11 to more uniformly cure the curing target.

As illustrated in FIG. 1, the temperature sensor 40 may be provided inside the base body 11 and may be fixed to the inside of the base body 11 through a bracket.

In the exemplary embodiment, a temperature may be controlled selectively according to a material property of the curing target through the temperature sensor 40.

Further, a temperature characteristic program according to characteristics of the curing target may be provided. For example, a first curing target may be programmed to operate for a cure time of 30 minutes and at a curing temperature of 60 degrees Celsius, a second curing target may be programmed to operate for a cure time of 20 minutes at a curing temperature of 80 degrees Celsius, and a third curing target may be programmed to operate for a cure time of 15 minutes and at a curing temperature of 80 degrees Celsius.

Further, the exemplary embodiment may have an automatic reservation function for automatically operating a specified temperature at a specified arbitrary time.

The heat energy supply unit 50 is provided inside the main body 10 and supplies the heat energy to the curing target to cure the curing target by irradiating efficient complex energy to post treatment curing of the curing target together with the light energy.

In the exemplary embodiment, the heat energy supply unit 50 may be disposed at an internal bottom portion of the body 10 as illustrated in FIG. 1.

Further, in the exemplary embodiment, the heat energy supply unit 50 may supply the heat energy by a light source scheme, e.g., a lamp or an LED in order to supply effective heat energy.

Meanwhile, in the present embodiment, as illustrated in FIG. 6B, the curing target may be cured faster than the related art by shortening a rise time of the temperature by increasing the temperature to 70% of a target temperature at the same time as a power supply is turned on.

Specifically, in the case of curing the curing target in a short time by increasing the temperature up to 70% of the curing temperature of the curing target when the power is applied in the exemplary embodiment through the heat energy supply unit 50 provided inside the main body 10. Therefore, there is an advantage that an overall cure time of the curing target may be shortened.

In addition, in the exemplary embodiment, an on/off state of the plurality of irradiating lamps 22 may be checked from the outside the main body 10 at the time of operating the plurality of light energy irradiating units 20. In the exemplary embodiment, as an example, current of each irradiating lamp 22 is measured to check whether the plurality of irradiating lamps 22 is abnormal. For example, when current flowing on a specific irradiating lamp 22 among the plurality of irradiating lamps 22 is equal to or lower than set current, it may be determined that the irradiating lamp 22 is abnormal and the flow of the current may be displayed through a display unit provided in the base body 11 or the lower fixation plate 13.

As described above, in the exemplary embodiment, the inside of the main body is formed in the sealed structure and the reflection plate is provided inside the sealed main body and the plurality of light energy irradiating units is provided to cure the curing target placed on the support unit by uniformly irradiating the light energy by the reflection plate.

Further, since the support unit placed in the curing target is rotatably provided, the curing target can be more uniformly and efficiently cured.

As described above, the present invention is not limited to the exemplary embodiments described herein, and it would be apparent to those skilled in the art that various changes and modifications might be made without departing from the spirit and the scope of the present invention. Therefore, it will be determined that the changed examples or modified examples are included in the appended claims of the present invention.

What is claimed is:

1. A curing device for a 3D printer, comprising:
    a main body;
    a plurality of light energy irradiating units provided inside the main body; and
    a support unit provided inside the main body and rotatably supporting a curing target,
    wherein the main body includes:
        a reflection plate therein and having a sealing structure;
        a base body accommodating the plurality of light energy irradiating units and the reflection plate therein; and
        a lower fixation plate supporting a lower portion of the base body,
    wherein the support unit includes:
        a support in which one side portion is rotatably disposed on the lower fixation plate through an internal bottom portion of the base body; and
        a rotation plate coupled to the other portion of the support and rotated together with the support and disposed inside the base body and placed with the curing target,
    wherein a plurality of plate holes is provided on the rotation plate,
    wherein the plurality of light energy irradiating units are disposed at the internal bottom portion of the base body,
    wherein the rotation plate is disposed above the plurality of light energy irradiating units,
    wherein the plurality of light energy irradiating units are configured to emit light through the plurality of plate holes to irradiate the curing target such that the curing target is cured, and
    wherein the reflection plate is provided on an internal bottom wall, a ceiling wall, and side walls of the main body as a whole.

2. The curing device for a 3D printer of claim 1, wherein the plurality of light energy irradiating units includes:
    a plurality of lamp supports coupled to a rear wall of the main body; and
    a plurality of irradiating lamps coupled to the plurality of lamp supports and irradiating the curing target with the light energy.

3. The curing device for a 3D printer of claim 2, wherein the plurality of lamp supports is arranged on the rear wall according to a shape that is substantially circular.

4. The curing device for a 3D printer of claim 3, wherein the plurality of lamp supports is disposed spaced apart from each other.

5. The curing device for a 3D printer of claim 1, wherein the support unit further includes a rotating motor provided on the lower fixation plate and rotating the support.

6. The curing device for a 3D printer of claim 1, further comprising:
    a temperature sensor disposed inside the main body.

* * * * *